US008001526B2

(12) United States Patent
Morgan

(10) Patent No.: US 8,001,526 B2
(45) Date of Patent: Aug. 16, 2011

(54) HIERARCHICAL PROPERTY STORAGE

(75) Inventor: Ashley L. Morgan, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 1621 days.

(21) Appl. No.: 11/228,617

(22) Filed: Sep. 15, 2005

(65) Prior Publication Data

US 2007/0061343 A1    Mar. 15, 2007

(51) Int. Cl.
*G06F 9/44* (2006.01)
*G06F 3/00* (2006.01)

(52) U.S. Cl. ........ 717/120; 717/105; 717/116; 717/165; 717/166; 715/700; 715/713; 715/762

(58) Field of Classification Search ........................ None
See application file for complete search history.

(56) References Cited

U.S. PATENT DOCUMENTS

| | | | |
|---|---|---|---|
| 4,498,145 A | 2/1985 | Baker et al. ................ 707/202 |
| 5,682,468 A | 10/1997 | Fortenbery et al. ........... 345/419 |
| 5,850,507 A | 12/1998 | Ngai et al. ...................... 714/16 |
| 6,282,547 B1 | 8/2001 | Hirsch ......................... 707/102 |
| 6,374,251 B1 | 4/2002 | Fayyad et al. ................. 707/101 |
| 6,380,954 B1 | 4/2002 | Gunther ....................... 715/764 |
| 6,493,826 B1 | 12/2002 | Schofield et al. ............... 726/22 |
| 6,539,396 B1 | 3/2003 | Bowman-Amuah ...... 707/103 R |
| 6,618,851 B1 | 9/2003 | Zundel et al. ................. 713/103 |
| 6,654,757 B1 | 11/2003 | Stern ............................. 707/101 |
| 6,711,577 B1 | 3/2004 | Wong et al. ................... 707/101 |
| 6,725,421 B1 | 4/2004 | Boucher et al. ............... 715/205 |
| 6,732,090 B2 | 5/2004 | Shanahan et al. ................ 707/3 |
| 6,772,170 B2 | 8/2004 | Pennock et al. ............... 707/102 |
| 6,778,979 B2 | 8/2004 | Grefenstette et al. ............. 707/3 |
| 6,820,075 B2 | 11/2004 | Shanahan et al. ................ 707/3 |
| 6,986,123 B2 * | 1/2006 | Finocchio .................... 717/116 |
| 7,055,132 B2 * | 5/2006 | Bogdan et al. ................ 717/116 |
| 7,412,658 B2 * | 8/2008 | Gilboa .......................... 715/762 |
| 7,499,955 B2 | 3/2009 | Kao et al. ...................... 707/202 |
| 7,707,550 B2 * | 4/2010 | Resnick et al. ............... 717/121 |
| 7,721,205 B2 | 5/2010 | Morgan et al. ................ 715/273 |
| 7,757,212 B2 * | 7/2010 | Wagner et al. ................ 717/120 |
| 7,783,971 B2 | 8/2010 | Villaron et al. ............... 715/248 |
| 2003/0078913 A1 | 4/2003 | McGreevy ....................... 707/3 |
| 2003/0078935 A1 | 4/2003 | Zibin et al. .................... 707/101 |
| 2004/0002991 A1 * | 1/2004 | Bogdan et al. ................ 707/102 |
| 2004/0003138 A1 * | 1/2004 | Finocchio .................... 709/328 |
| 2004/0189667 A1 * | 9/2004 | Beda et al. .................... 345/619 |

(Continued)

OTHER PUBLICATIONS

"Modular typechecking for hierarchically extensible datatypes and functions", Millstein et al., Oct. 2002, pp. 110-122, <http://delivery.acm.org/10.1145/590000/581489/p110-millstein.pdf>.*

*Primary Examiner* — Thuy Dao
(74) *Attorney, Agent, or Firm* — Merchant & Gould

(57) ABSTRACT

A property storage structure is provided that is configured to store properties for a display object. The property storage structure includes a property object that corresponds to a property of the display object. The property storage structure is identified according to a key (e.g., the key identifies the property object as a fill style object that corresponds to a fill style property for the display object). The property object hierarchically includes a value designating what type of object for the property object identified by the key (e.g., the fill style object includes a value that designates the fill style object as a solid color fill type).

20 Claims, 6 Drawing Sheets

U.S. PATENT DOCUMENTS

| | | | |
|---|---|---|---|
| 2004/0220954 A1 | 11/2004 | Zhou et al. | 707/101 |
| 2004/0230888 A1 | 11/2004 | Kramer et al. | 715/501.1 |
| 2004/0230900 A1* | 11/2004 | Relyea et al. | 715/513 |
| 2005/0015729 A1 | 1/2005 | Fernandez et al. | 715/765 |
| 2005/0171967 A1 | 8/2005 | Yuknewicz et al. | 707/101 |
| 2005/0216883 A1* | 9/2005 | Ishimitsu et al. | 717/105 |
| 2005/0278625 A1 | 12/2005 | Wessling et al. | 715/62 |
| 2006/0230311 A1 | 10/2006 | Kao et al. | 707/202 |
| 2006/0242591 A1 | 10/2006 | Van Dok et al. | 715/762 |
| 2007/0061343 A1 | 3/2007 | Morgan | 707/100 |
| 2007/0061351 A1 | 3/2007 | Villaron et al. | 707/101 |
| 2007/0074156 A1* | 3/2007 | Nelson et al. | 717/107 |
| 2007/0094607 A1* | 4/2007 | Morgan et al. | 715/762 |
| 2007/0106952 A1 | 5/2007 | Matas et al. | 715/764 |
| 2007/0174307 A1 | 7/2007 | Villaron et al. | 707/100 |

* cited by examiner

HIERARCHICAL PROPERTY STORAGE

BACKGROUND

A number of different properties may be used to describe a display object, whether the display object is a graphical object that includes shapes or another type of display object. A display object may include shape properties as well as text character properties, text paragraph properties, text body properties, group shape properties, and the like. Shape properties form a "language" for describing a visual object we think of as a shape. A shape has a transform (location, scale, rotation, skew, etc.), a path (rectangle, oval, star, banner, etc.), a fill style (none, solid color, texture, etc.), a line style (none, solid color, texture, etc.) and several other properties. The set of shape properties is often referred to as the Shape Property Bag (SPB). Some solutions store the set of properties related to an object as a flat list fields that encompassed all possible values of a particular concept. For example, the fill style on a shape could be either a solid color or a texture, but even when the fill was a solid color, an entry in the flat table was still supplied for the texture type of fill. This storage structure may create a security concern of stale information sitting around in properties not being used. Also, the flat storage may cause cross-references between properties or additional properties to be included in the flat storage structure that are included to simply reference the valid shape property that is to be applied to the shape.

SUMMARY

Aspects of the system, data structure, and methods described herein are generally related to providing a hierarchical property storage structure. The hierarchical structure reflects the mutual exclusiveness of certain properties and eliminates the cross-references among properties in the storage structure. For example, a structure storing shape properties may include a fill style property. A fill style property is a set selection of a solid color fill, a gradient fill, a textured fill, or no fill and may only be one of those selections at a time. If the fill is currently a solid color fill, the data stored in the hierarchical data structure is limited to data indicating the solid color fill selection. If a change to the fill style is made to a textured fill selection, the data for the solid color fill is removed and replaced with data for the textured fill selection. Since the properties are hierarchically structured, cross-references among properties or additional properties are not needed to determine which properties are valid. Properties considered invalid simply do not exist in the hierarchical structure to be queried. Accordingly, the hierarchical data structure improves the complexity of querying properties as well as reducing the working set of properties since it is the "in use" properties that are stored, rather than all possible properties.

In addition to the aspects associated with the hierarchical structure of the property storage structure, the present invention also provides the structure according to code that is compile-time type-safe. The type-safe code assists in discovering errors at compile time, rather than later at runtime.

Although descriptions of the hierarchical property storage are provided in contrast to previous flat storage structures, the claimed subject matter as described herein is not limited to implementations that solve any or all of the noted disadvantages attributed to the flat storage structures.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Illustrative Operating Environment

Figure 1:
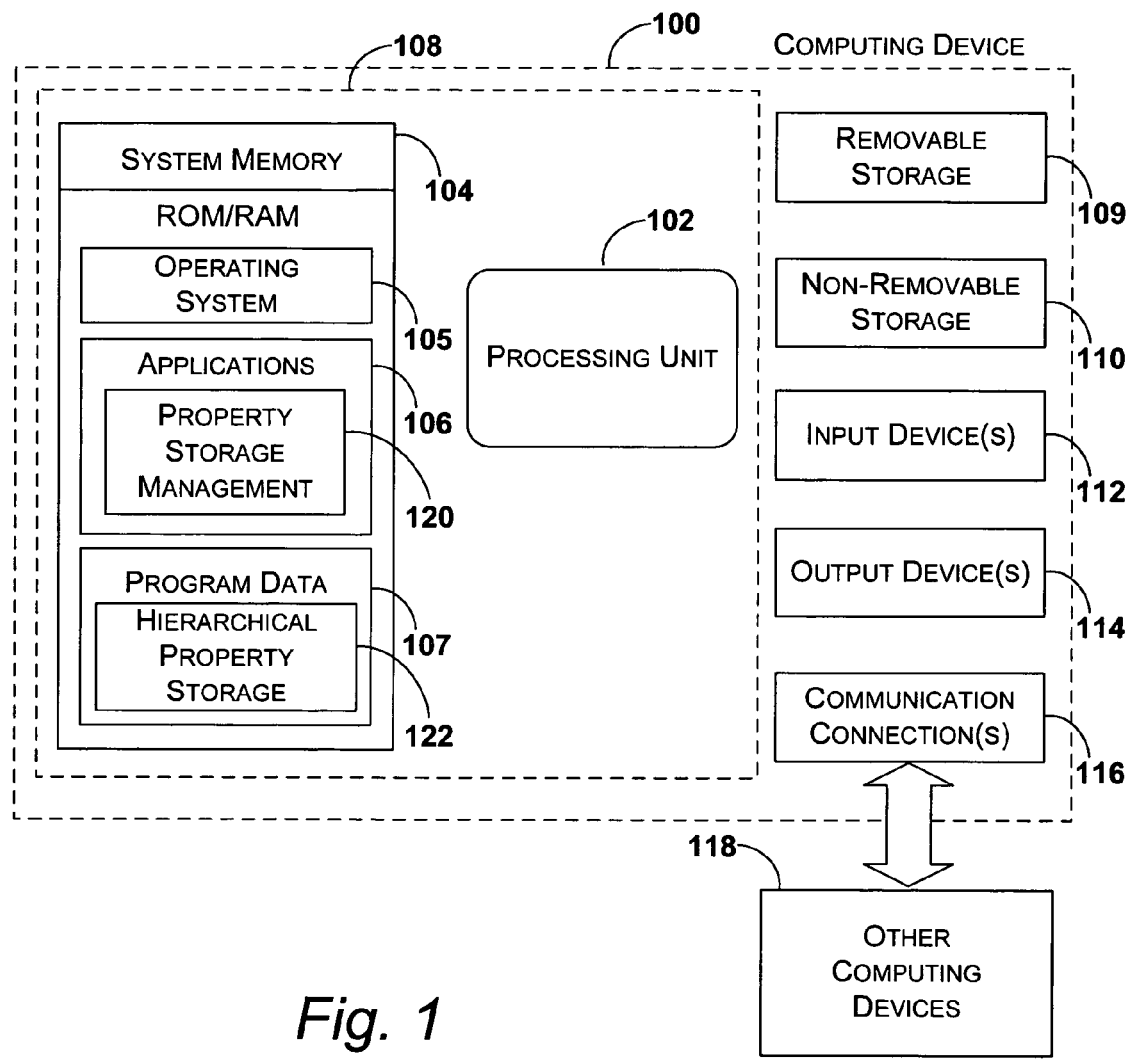
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107.

In one embodiment, application 106 includes a property storage management application 120 for implementing the system of the present invention. Additionally, program data 107 includes the hierarchical property storage generated for a display object by the storage management application. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiments for Providing a Hierarchical Shape Property Storage

Embodiments described herein are generally related to generating a hierarchical property storage structure that may be used in storing the properties for a display object. The hierarchical structure of the property storage allows for an elimination of redundant information that was associated with flat storage structures. Additionally, cross-references and additional properties that previously needed to be included in the property storage are no longer necessary to identify which properties are valid. Although the description and figures in the following discussion concentrates on a hierarchical storage structure for storing shape properties, or a hierarchical shape property storage, the present invention is not limited to a storage for shape properties. The present invention may provide the hierarchical storage structure to store a variety of properties that may be associated with a graphical object or other type of display object, such as text character properties, text paragraph properties, text body properties, group shape properties, and the like.

Figure 2:
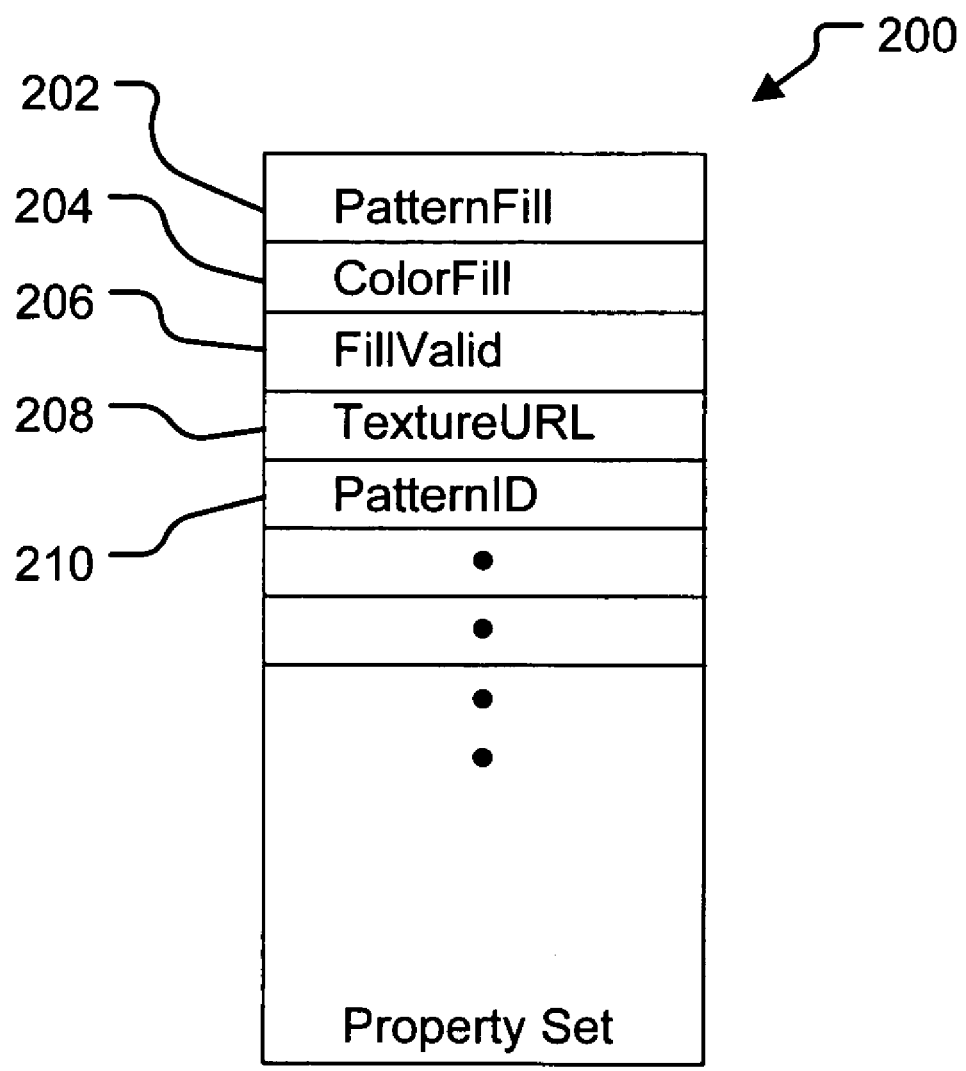
FIG. 2 shows a functional block diagram of an exemplary flat property storage.

FIG. 2 shows a functional block diagram of an exemplary flat property storage. Flat storage 200 includes multiple nodes (e.g., 202) that represent a property set for a particular shape. The property set shown includes example nodes directed to fill properties (202, 204, 206) as well as other properties associated with textures (208) and patterns (210). Properties other than those shown may also be included in flat storage 200.

As shown, flat storage 200 includes multiple properties for fill styles that correspond to a shape. Node 202 corresponds to a pattern type fill property (PatternFill). Node 204 corresponds to a color type fill property (ColorFill). When only one fill type may be associated with a particular shape, one of these fill type properties represents redundant, unnecessary information. The redundant fill type property is included in flat storage 200 even though it does not currently apply to any shape within a graphical object.

In addition, flat storage 200 also includes validation property 206 for the fill properties (FillValid). This validation property is included for the purpose of indicating which of the fill type properties (202 or 204) of flat storage 200 are valid for the shape associated with the storage structure. Still other nodes are dedicated to including a uniform resource locator (URL) for a particular texture (node 208) or an identifier for a particular pattern that is used for fills, lines, or other portions of a shape. For example, instead of referencing the type of pattern to use directly, pattern type fill property 202 may instead indicate a pattern identifier. A query for the property would then be redirected to node 210 wherein the pattern that corresponds to the pattern identifier is declared. However, it may be that this pattern is not locally stored in association with the graphical object containing the shape or the native application that generated the graphical object. Instead, the pattern corresponds to a texture file that is located elsewhere. Accordingly, the query for the property is again redirected to node 208 to where the location of the texture file is given.

As may be seen from the example above, discerning the properties to be applied to from flat storage 200 may become increasingly difficult as the cross-references and additional nodes increase in number. A developer desiring to edit flat storage directly may be unable to successfully trace the property to obtain all of its related information given the current structure.

Figure 3:
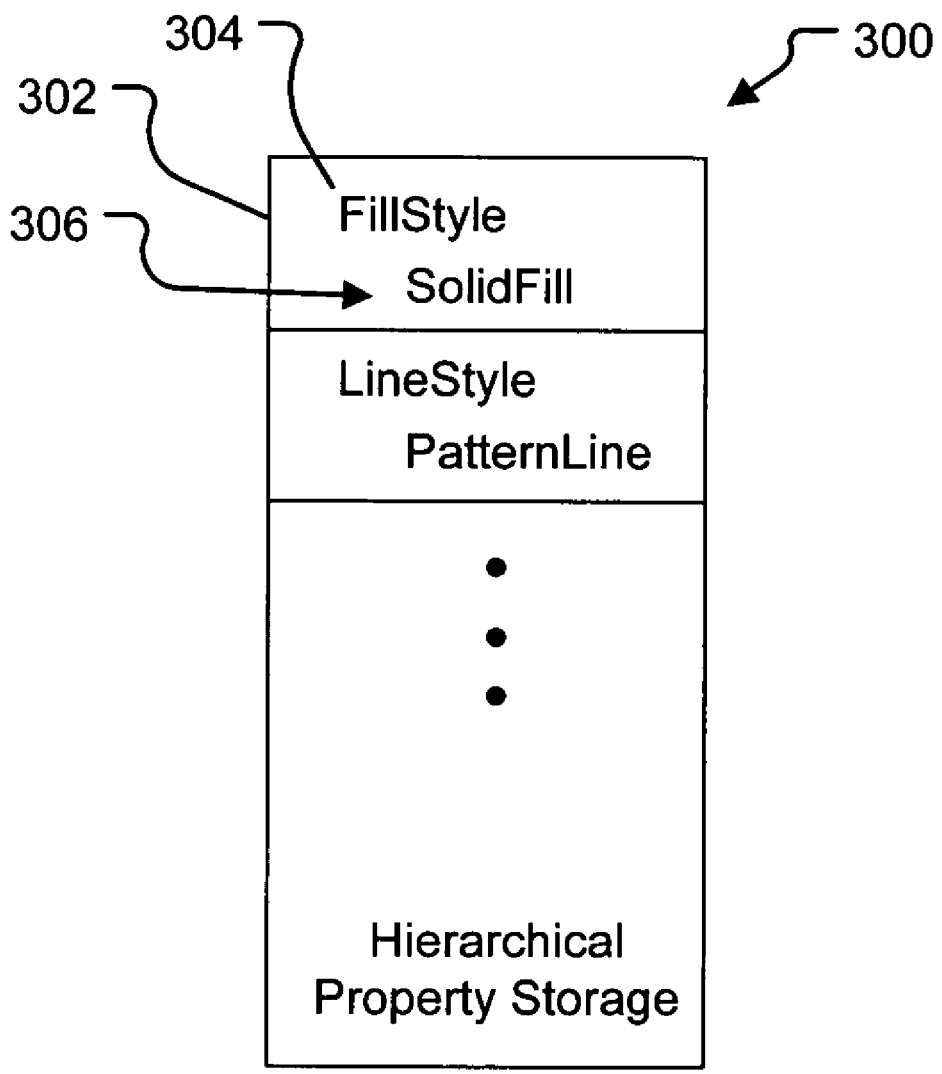
FIG. 3 illustrates a functional block diagram of an exemplary hierarchical property storage.

FIG. 3 illustrates a functional block diagram of an exemplary hierarchical property storage in accordance with one embodiment of the present invention. In this particular example, hierarchical property storage 300 corresponds to shape properties and may be refered to as shape property bag (SPB) 300. Hierarchical property storage 300 includes property objects (e.g., 302) that have hierarchical classes/keys and values instead of flat nodes. For example, fill style object 302 includes a key 304 and a value 306. Key 304 indicates the class of the shape property object. For example, the key for property object 302 is the fill style class 304 identifying property object 302 as a fill style object. Value 306 indicates that the fill style property of the shape associated with hierarchical property storage 300 is solid fill type property (SolidFill). The objects that may be included in hierarchical property storage 300 are not limited to fill styles and line styles as shown and may include any property that may be associated with a particular shape. Furthermore, hierarchical property storage 300 may be associated with properties other than shape properties, such text properties or the like.

In one embodiment, the objects of hierarchical property storage 300 are written according to an extensible markup language (XML) that lends to the hierarchical structure. The object acts as bucket or container for storing a particular value associated with the property. In one embodiment, hierarchical property storage 300 knows intrinsically which values (e.g., 306) are included in the property objects (e.g., 302) so that queries into hierarchical property storage 300 may be responded to with the correct property information. The information in the objects corresponds to the value for the property that is currently associated with the shape. If the shape has a solid color fill, then the value included in the fill type object indicates a SolidFill value. If instead the shape has a pattern fill, then the fill type object indicates a PatternFill value. Other objects have multiple values, for example a geometry type object may include various values for defining the geometry of a shape. Since the values included in the objects are intrinsically known by hierarchical property storage 300, there is no requirement for additional flags or properties within hierarchical property storage 300 for locating the property information.

Figure 5:
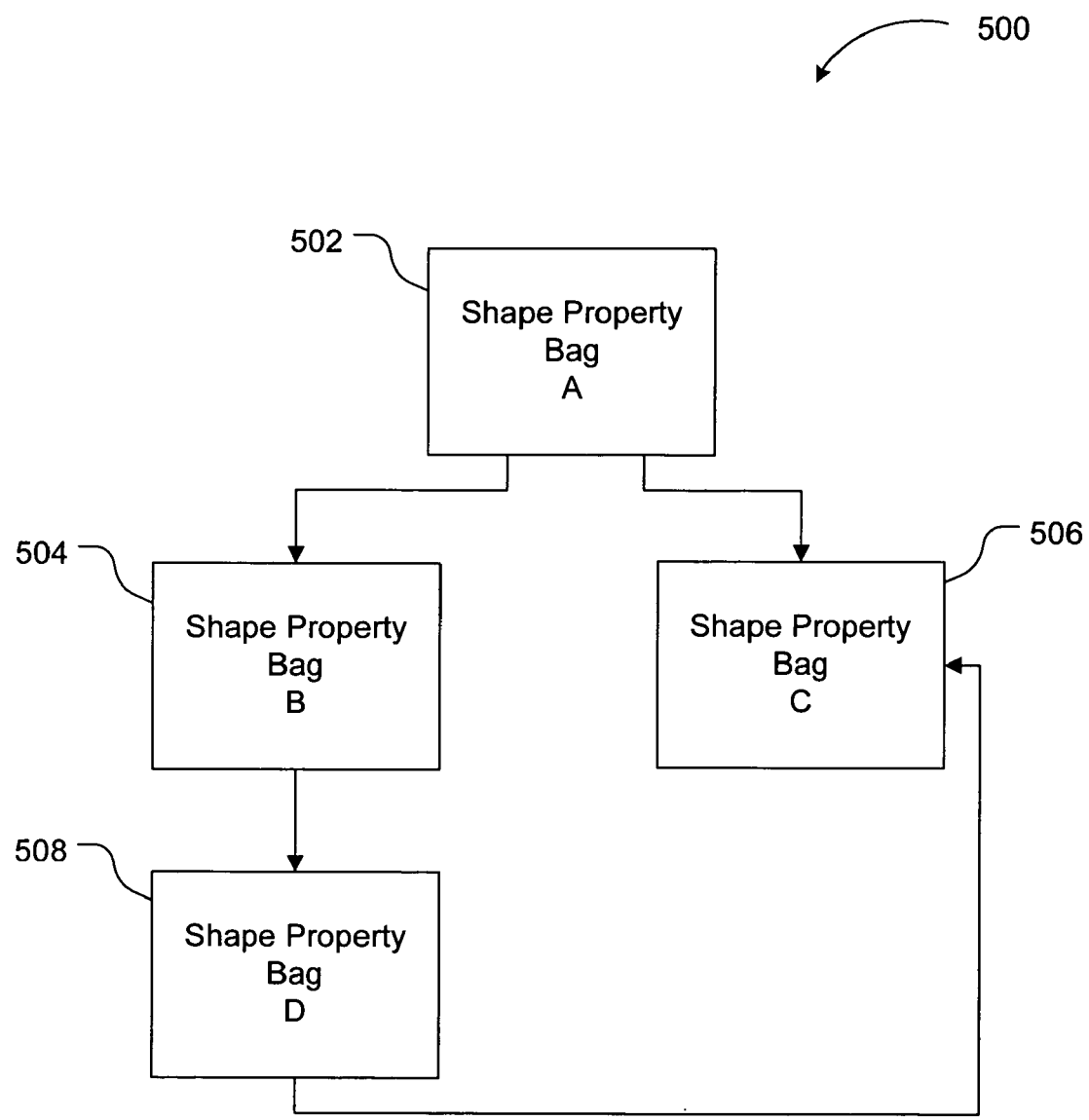
FIG. 5 illustrates a functional block diagram of an exemplary hierarchy of hierarchical storage structures.

As stated, the hierarchical shape storage structures or shape property bags (SPBs) may be used to store the properties related to a particular shape. A graphical object may have multiple shapes and therefore may have multiple SPBs associated with those shapes. Furthermore, each shape may have multiple SPBs associated with the shape. FIG. 5 describes in greater detail a particular hierarchical relationship that is available for SPBs due to the hierarchical structure provided by the present invention.

In one embodiment, the hierarchical storage structure for the properties is provided according to code that is considered more "strongly typed" than the code for the flat tables previously provided. "Strongly typed" code refers to code where type checking of the code cannot be meaningfully circumvented. Also, "strongly typed" code is often equated with "statically typed" code that generally enforces that the code is type-safe a compile time rather than at runtime. Type checking at compile time allows errors to be caught earlier in the code development process. Previously, with the flat table, type checking on the properties was generally not done at compile time. Previous designs for property storage relied on a key/value approach for retrieving properties. The key, was usually an integer or enumeration value, and the 'value' was either a polymorphic data structure (e.g., a variant) or the storage structure interface had multiple accessor methods that were value type specific (e.g., GetIntegerValue(int key, int& value) and GetFloatValue(int key, float& value), etc.) This type of design cannot be validated at compile time. Developers may incorrectly call GetIntegerValue(someKey, myInteger) to attempt to retrieve an integer value associated with 'someKey', even if it's really a floating point value that should be associated with 'someKey'. Detection of this type of error may only happen at runtime which makes detection of the error more difficult.

Runtime errors are only found if the code is executed, which depends on the breadth of the testing being done. One way to achieve type-matching between key and value at compile time was achieved in the past by not using a generic data type (like an integer) for the key, and instead creating specific methods to retrieve the properties (e.g., GetPropValue1 (int&), GetPropValue2(float&), GetPropValue3(string&)). The specific methods enforce that whenever an attempt is made to get 'Prop 1' from the property storage, a correct type must be provided to receive the value (in this case an integer). However, such a design is not generic and is instead specific to the set of properties being stored. Code sharing between two different property stores becomes extremely difficult or devolves into the key/value pair issue above.

The present invention improves the type-safety of the code by providing this type matching between key and value at compile time, but at the same time remaining generic. The present invention uses C++ templates and instead of using a generic type like an integer for all keys, a type (i.e. a class) is used as the key. Thus, each key is distinguishable from other keys. Inside the class, there's a typedef that tells the property storage data structure the type used for the value. The developer creates these "key types" while designing the set of properties to be stored. Once decided, the rest of the property storage data structure code enforces that the correct value type is used for a given key.

When the get operation is called, the compiler knows the types of objects associated with a particular type list and also knows the type of object that should be returned in response to the get operation. If code is written that attempts to get a property that is not valid for this property set, the code won't compile. Similarly, the code won't compile if the requested return object is an incorrect type for the property identified by the get operation. Since the code is required to be correct at compile time, the robustness of the code is increased by making the code more statically written and results in more strongly typed code.

Figure 4:
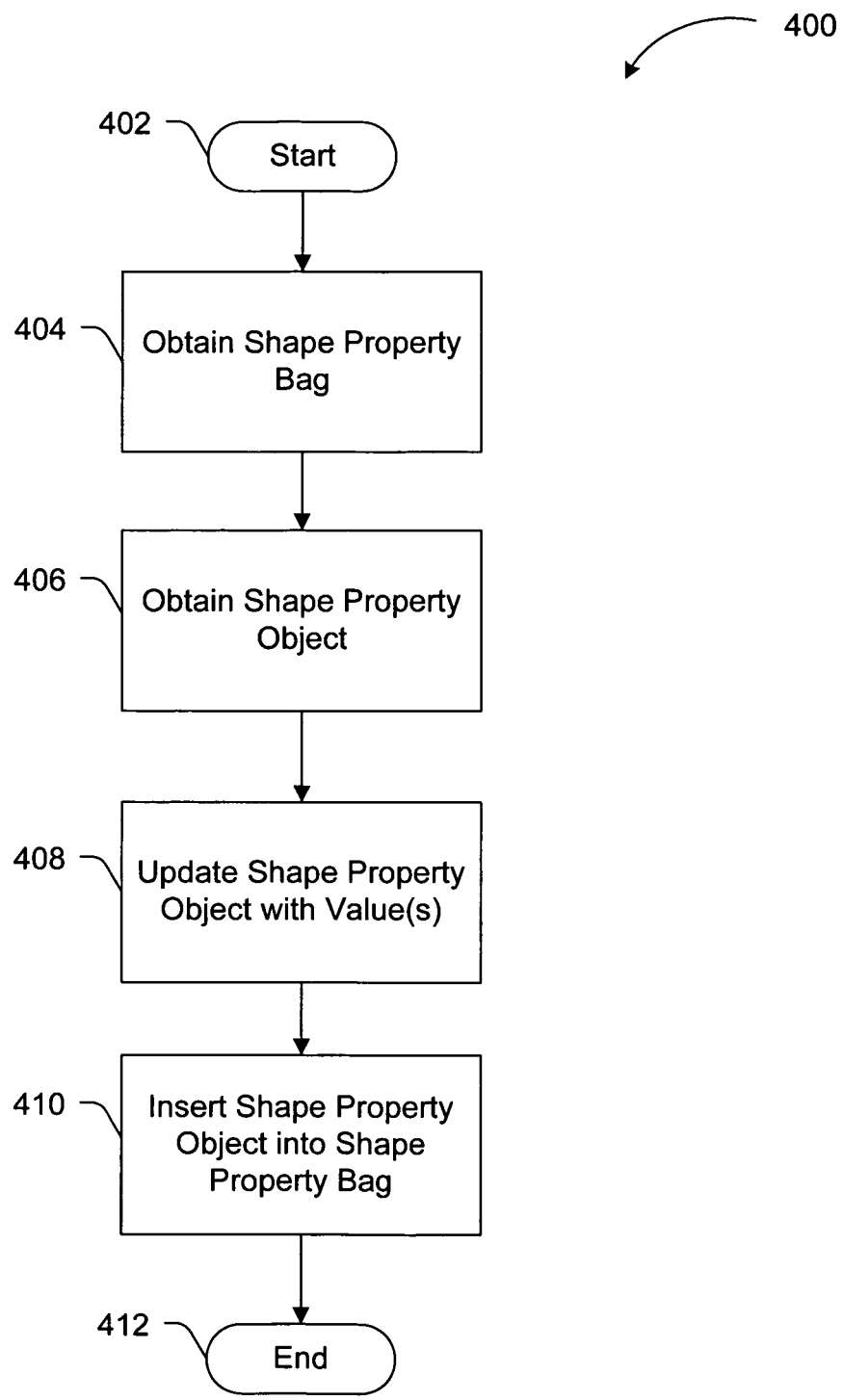
FIG. 4 shows a logical flow diagram of an exemplary process for populating a hierarchical property storage.

FIG. 4 shows a logical flow diagram of an exemplary process for populating a hierarchical property storage in accordance with one embodiment of the present invention. Process 400 is described with relation to storing shape properties as shape property objects within an SPB, but may also apply to storing other properties as other property objects in different hierarchical property storage structures. Process 400 starts at block 402 where a shape is included in a graphical object. Processing continues at block 404.

At block 404, an SPB is obtained that is associated with the shape. The SPB may be obtained by newly creating the SPB or identifying an existing SPB that is associated with the shape. For example, a shape newly inserted into the graphical object may have no associated SPB and require one to be generated. Alternatively, the shape may be copied, or obtained from a listing of default shapes, and therefore already has an associated SPB which can be referenced. Additionally, the shape may be already inserted into the graphical object but is having one or more of its properties changed. The default properties are inserted into the SPB in a similar manner that other new properties are inserted into the SPB from edits to the shape or that existing properties of an SPB are changed. In one embodiment, the SPB may correspond to a C++ template. Once the SPB is obtained, processing continues at block 406.

At block 406, a shape property object is obtained for a property associated with the shape. The shape property object may correspond to a default property or other new property being applied to the shape and therefore be newly constructed. In an alternative embodiment, the shape property object of interest may already be included in the SPB. If the shape property object is already present in the SPB, then a get operation is performed that passes in the object's identifier to the SPB to retrieve the object. Once the shape property object is obtained, either by constructing a new object or obtaining the object from the SPB, processing continues at block 408.

At block 408, the shape property object is populated with its associated values or edited to include an updated value. A set operation is called on the shape property object that sets the value(s) included in the object. In one embodiment, a first value (e.g., SolidFill) of the shape property object is mutually exclusive of a second value (e.g., PatternFill). In an additional embodiment, a new shape property object may be populated with a value that corresponds to a default property of the shape. For example, a shape inserted into a graphical object may have default fill styles, default line thicknesses, default colors, or the like. The shape property object may be associated with one or more of these default properties. These properties may be associated with the document in which the shape is inserted or with the shape itself. If the shape property object is being edited, the set operation replaces the existing value(s) include in the object with the updated value(s). Processing continues at block 410.

At block 410, the shape property object is inserted into the SPB. In one embodiment, a typesafe (i.e., strongly typed) set operation is called to set the shape property object as a member of the SPB. With the shape property object included into the SPB, the SPB becomes intrinsically aware of the object and its values. Accordingly, when template access operations are called on the SPB with regard to the property of the shape property object, the SPB is able to respond to the operations. Processing then continues to block 412 where process 400 ends or moves on to other tasks.

In one embodiment, the steps described according to process blocks 406-410 may be repeated for as many properties as are associated with the shape or that have been changed in the SPB. Furthermore, the SPB may be associated with other SPBs such that the properties included in the SPB correspond to only those properties unique to the shape to which the SPB applies.

FIG. 5 illustrates a functional block diagram of an exemplary hierarchy of hierarchical storage structures in accordance with the present invention. Hierarchy 500 is described with relation to storing shape properties within an SPB, but may also apply to other properties included in different hierarchical property storage structures. Hierarchy 500 includes SPBs A 502, B 504, C 506, and D 508.

In one embodiment, the SPBs lower in the hierarchy have one or more shape properties that depend from the SPB higher in the hierarchy. For example, if SPB A 502 includes a fill style property that corresponds to a solid color fill, SPB B 504 or SPB C 506 may not include its own value for the fill style property. Instead these SPBs lower in the hierarchy may have the shape property object for the fill style include a reference to the shape property object corresponding to the fill style property in SPB A 502. Additionally, a SPB may have a property that depends from another SPB that in turn depends from yet another SPB as shown by SPB D 508. In still another embodiment, an SPB may have multiple dependencies to other SPBs. For example, SPB C 506 has at least one property dependent from SPB A 502 and another property dependent from SPB D 508. Chaining the SPBs together reduces the memory needed to store the property information for multiple similar shapes in a graphical object. For example, if one thousand shapes were included in a graphical object that were essentially the same shape except for their location on the screen (e.g., points on a scatter plot), it would be a waste of memory space to store the properties for each of these shapes individually.

Figure 6:
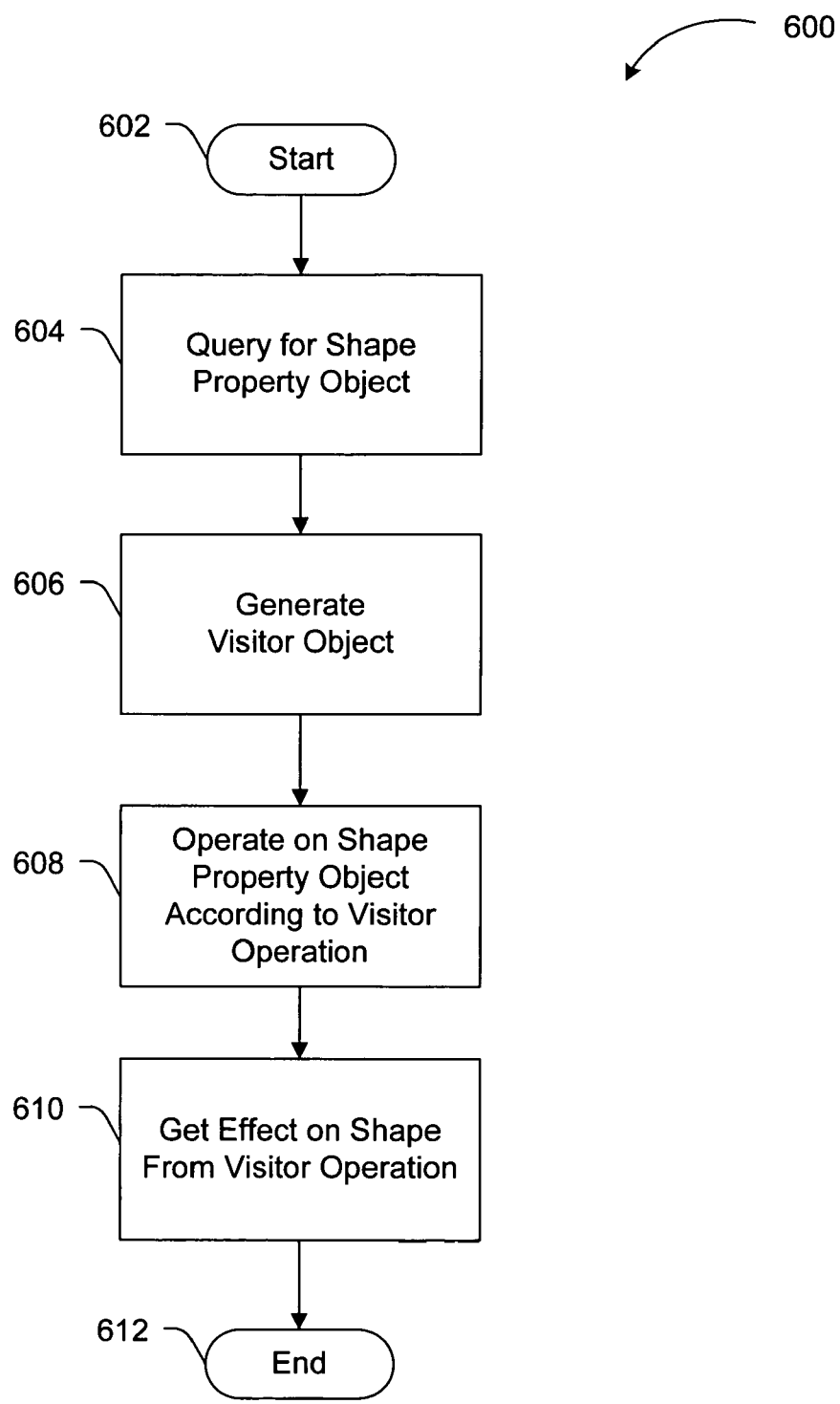
FIG. 6 shows a logical flow diagram of an exemplary process for translating a property object for rendering, in accordance with one embodiment of the present invention.

FIG. 6 shows a logical flow diagram of an exemplary process for translating a property object for rendering in accordance with one embodiment of the present invention. Process 600 is described with relation to storing shape properties as shape property objects within an SPB, but may also apply to storing other properties as property objects in different hierarchical property storage structures. Process 600 starts at block 602 where an SPB has been created and populated with shape property objects. Processing continues at block 604.

At block 604, a query is made for a shape property object according to which effect of interest is to be applied to the rendered shape. The effect refers to the graphical representation of the property. For example, the effect of a pattern fill property is a pattern that fills in the area of a particular shape when the shape is viewed on a display device, or when the shape is output to a printer, or when the shape is otherwise output and viewable to a user. In one embodiment, the query for the shape property object is made according to a get operation that retrieves the shape property object. Once the shape property object is retrieved, processing continues to block 606.

At block 606, a visitor object is generated for the shape property object retrieved. For example, a fill style visitor object is generated for a retrieved fill style object. The fill style visitor object has methods for handling each type of fill style for the shape. For example, one of these methods may correspond to an operation such as "OnSolidColorFill( )" that provides a set of functions for handling the fill style object when the fill style object corresponds to a solid color fill. Once the visitor object is generated, processing continues to block 608.

At block 608, the shape property object is operated on according to the visitor object generated. This visitor operation executes the code or functions that are related to the current value for the retrieved shape property object. For example, when a fill style object corresponds to a solid color fill, the functions associated with the "OnSolidColorFill( )" visitor operation is executed. The visitor operation translates the shape property object into instructions for handling the property. Once the visitor operation is executed, processing continues at block 610.

At block 610, the effect from the visitor operation is applied to the shape associated with the SPB. In one embodiment, a get operation obtains the effect from the executed visitor operation. With the effect applied to the shape, processing continues to block 612 where process 600 ends or moves on to other tasks.

The processes described in FIGS. 4 and 6 may be repeated as necessary, and may have their process steps rearranged, certain process steps deleted, or additional process steps added without departing from the spirit or scope of the invention. For example, multiple SPBs may be generated for a number of different shapes and associated with one another as described in FIG. 5 before each property for a particular shape is translated for its effect on the shape when the shape is rendered. Furthermore, the entire property set of the SPB may be translated at any given time for its effect on the shape so that process 600 is repeated for each shape property object included in the SPB.

As previously stated, the discussion above concentrates mainly on shape property storage. However, the hierarchical storage structure provided by the present invention is not limited to storing shape properties and may store other properties such as group shape properties, text properties, text character properties, text paragraph properties, text body properties, and other properties that may be associated with a display object.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for providing hierarchical storage of properties associated with a display object, the method executed by a central processing unit (CPU) comprising:

obtaining a property storage structure that is configured to hierarchically store shape properties for each shape that is associated with a display object; wherein the property storage structure is stored separately from a definition of the shape;

obtaining a shape property bag for each shape that is associated with the display object, wherein each shape property bag within the property storage structure can reference one or more other shape property bags within the property storage structure;

obtaining a property object that is associated with one of the properties of the display object, wherein the property object is identified according to a key;

updating the property object with a hierarchically stored value such that the hierarchically stored value indicates a type for the property object identified by the key; and inserting the property object into the property storage structure such that the shape property objects inserted into the property storage structure provide a listing of the properties associated with the display object.

2. The computer-implemented method of claim 1, wherein obtaining the property storage structure further comprises newly generating the property storage structure to correspond to the display object.

3. The computer-implemented method of claim 1, wherein obtaining the property storage structure further comprises identifying the property storage structure previously associated with the display object.

4. The computer-implemented method of claim 1, wherein obtaining the property object further comprises newly generating the property object.

5. The computer-implemented method of claim 1, wherein obtaining the property object further comprises performing a get operation that passes the key of the property object into the property storage structure and returns the property object.

6. The computer-implemented method of claim 1, wherein updating the property object with a hierarchically stored value further comprises calling a set operation that sets the hierarchically stored value.

7. The computer-implemented method of claim 1, wherein updating the property object with a hierarchically stored value further comprises further comprises setting the hierarchical stored value to correspond to a default value.

8. The computer-implemented method of claim 1, wherein the hierarchically stored value is mutually exclusive of other hierarchically stored values that indicate other types of property objects identifiable by the key.

9. The computer-implemented method of claim 1, wherein inserting the property object into the property storage structure further comprises calling a typesafe operation that sets the property object as a member of the property storage structure such that the property storage structure is intrinsically aware of the key and the hierarchically stored value.

10. The computer-implemented method of claim 1, further comprising chaining an additional property storage structure to the property storage structure, such that the additional property storage structure references the property object.

11. The computer-implemented method of claim 1, further comprising:

querying for the property object once the property object includes the key and hierarchically stored value such that the property object is retrieved from the property storage structure;

generating a visitor object that corresponds to the property object, wherein the visitor object includes a set of functions for handling each type of property objects identifiable by the key;

operating on the property object according to a function in the set of functions that corresponds to the type indicated by the hierarchically stored value; and applying an effect to the display object, wherein the effect corresponds to a result obtained from the function.

12. A computer-readable storage medium having stored thereon instructions that when executed implements the computer-implemented method of claim 1.

13. A computer-readable storage medium having stored thereon a data structure, the data structure comprising:

a property storage structure that is configured to hierarchically store shape properties for each shape that is associated with a display object; wherein the property storage structure is stored separately from a definition of the shape; wherein each of the shape properties are set to a single value that is selected from mutually exclusive values for each of the shape properties; wherein a separate property storage structure is associated with each shape that comprises a display object;

a shape property bag for each shape that is associated with the display object;

wherein each shape property bag within the property storage structure can reference one or more other shape property bags within the property storage structure, wherein each shape property bag comprises:

a property object included in the property storage structure, wherein the property object corresponds to one of the shape properties of the display object;

a key that is included in the property object, wherein the key identifies the shape property that is included in the property object; and a value that is hierarchically included in the property object corresponding to the key, wherein the value designates a type associated with the property object, wherein the value is selected from the mutually exclusive values that are associated with the shape property that is included in the property object.

14. The computer-readable storage medium of claim 13, wherein the property object references another property storage structure for its value.

15. The computer-readable storage medium of claim 13, wherein the property storage structure is stored according to code that is considered strongly typed code.

16. The computer-readable storage medium of claim 13, wherein the property storage structure is stored according to code configured so that type matching between the key and value are enforced at compile time.

17. The computer-readable storage medium of claim 13, wherein the property storage structure corresponds to a coded template.

18. The computer-readable storage medium of claim 17, wherein the template is passed a coded type list that is used to describe the properties of the display object.

19. A system for providing hierarchical storage of properties associated with a display object, comprising:
  a computing device; and
  a memory associated with the computing device, the memory having stored thereon a property storage structure that is hierarchical and computer-executable instructions for managing the property storage structure, wherein the property storage structure is configured to hierarchically store shape properties for each shape that is associated with a display object;
wherein the property storage structure is stored separately from a definition of the shape, the computer-executable instructions comprising:
  retrieving a shape property bag for each shape that is associated with the display object, wherein each shape property bag within the property storage structure can reference one or more other shape property bags within the property storage structure;
  retrieving a property object that corresponds to one of the shape properties of the display object from the property storage structure when the property object includes an associated key and value, wherein the key identifies the property object and the value indicates a type for the property object, wherein each of the shape properties are set to a single value that is selected from mutually exclusive values for each of the shape properties; wherein a separate property storage structure is associated with each display object;
  generating a set of functions for handling each type of property objects identifiable by the key,
  operating on the property object according to a function in the set of functions that corresponds to the type of property object, and
  applying an effect to the display object, wherein the effect corresponds to a result obtained from the function.

20. A computer-readable storage medium having stored thereon instructions that when executed implements the functionality of the system of claim 19.

* * * * *